(12) United States Patent
Chang

(10) Patent No.: US 7,468,850 B2
(45) Date of Patent: Dec. 23, 2008

(54) MOBILE COMMUNICATION DEVICE

(75) Inventor: Jen-Tsorng Chang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 11/692,066

(22) Filed: Mar. 27, 2007

(65) Prior Publication Data

US 2008/0165439 A1 Jul. 10, 2008

(30) Foreign Application Priority Data

Dec. 25, 2006 (CN) .......................... 2006 1 0201389

(51) Int. Cl.
*G02B 7/02* (2006.01)
(52) U.S. Cl. .................... 359/813; 359/672; 348/374; 348/376
(58) Field of Classification Search ................. 359/672, 359/813; 348/373–376; 455/556.1, 575.1, 455/575.4
See application file for complete search history.

(56) References Cited

U.S. PATENT DOCUMENTS

2006/0234786 A1* 10/2006 Taniguchi et al. ........ 455/575.4
2006/0262183 A1 11/2006 Bestie et al.

* cited by examiner

*Primary Examiner*—Joseph Martinez

(57) ABSTRACT

A mobile communication device includes a main body, a cover body, a first lens module, at least one positioning hole, a second lens module, at least one resilient positioning member and an image sensor. The cover body is slidably mounted on the main body between a first position and a second position. The through hole is defined in the main body and configured for receiving the first lens module. The at least one positioning hole is defined in the first lens module. The second lens module and the image sensor are received in the cover body. The at least one resilient positioning member is defined in the cover body and engaging in the positioning hole at the first position. The image sensor is configured for detecting light from the first and second lens module at the first position and light from the second lens module at the second position.

12 Claims, 6 Drawing Sheets

MOBILE COMMUNICATION DEVICE

BACKGROUND

1. Technical Field

The present invention relates generally to mobile communication devices, and more particularly to a mobile communication device with a camera module having a zooming function.

2. Description of Related Art

Currently, camera modules, especially digital camera modules are in widespread use in mobile communication devices such as mobile phones. Most mobile communication devices are becoming progressively more miniaturized over time, and camera modules are required correspondingly to become smaller and smaller. Besides having a small size of a camera module, consumers still demand excellent imaging performance, such as the zooming functions used in professional camera devices, including, e.g., still camera devices, digital camera devices and video camera devices.

Zooming techniques have been widely employed in the above professional camera devices. The zooming function is carried out by a mechanism wherein a distance of a lens assembly relative to another lens assembly and an image sensor varies along an optical axis. Generally, the camera device usually uses actuators, such as step motors, to drive a lens assembly to achieve the zooming function. However, the actuators are relatively bulky in volume, which is unsatisfied in the mobile communication devices. In addition, the step motors consume a substantial amount of power, especially relative to the amount of power that can be stored in a typical battery system of the mobile communication devices.

What is needed, therefore, is a mobile communication device which overcomes the above-mentioned problems.

SUMMARY

In a preferred embodiment, an exemplary mobile communication device includes a main body, a cover body, a first lens module, a second lens module and an image sensor. The main body has a through hole defined therethrough. The first lens module has at least one positioning hole therein and is received in the through hole of the main body. The cover body defines a recess therein with the second lens module and the image sensor received in alignment in the recess thereof, the cover body has at least one resilient positioning member for snappingly engaging in the positioning hole. The cover body is slidably mounted on the main body between a first position where the at least one resilient positioning member is engaged in the positioning hole, the second lens module is aligned with the first lens module and the image sensor is capable of detecting light from the first and second lens modules, and a second position where the at least one resilient positioning member is disengaged in the positioning hole, the second lens module is misaligned with the first lens module and the image sensor is capable of detecting light from the second lens module.

In another preferred embodiment, an exemplary mobile communication device includes a main body, a cover body, a first lens module, a second lens module and an image sensor. The main body has a through hole defined therethrough, and at least one positioning hole defined therein adjacent to the through hole. The first lens module is received in the through hole of the main body. The cover body defines a recess therein with the second lens module and the image sensor received in alignment in the recess thereof, the cover body has at least one resilient positioning member for snappingly engaging in the positioning hole. The cover body is slidably mounted on the main body between a first position where the at least one resilient positioning member is engaged in the positioning hole, the second lens module is aligned with the first lens module and the image sensor is capable of detecting light from the first and second lens modules, and a second position where the at least one resilient positioning member is disengaged from the positioning hole, the second lens module is misaligned with the first lens module and the image sensor is capable of detecting light from the second lens module.

Other advantages and novel features of the present invention will become more apparent from the following detailed description of preferred embodiment when taken in conjunction with the accompanying drawings.

BRIEF DESCRIPTION OF THE DRAWINGS

Many aspects of the mobile communication device can be better understood with reference to the following drawings. The components in the drawing are not necessarily drawn to scale, the emphasis instead being placed upon clearly illustrating the principles of the present mobile communication device. Moreover, in the drawings, like reference numerals designate corresponding parts throughout the several views.

DETAILED DESCRIPTION OF THE PREFERRED EMBODIMENTS

Embodiments of the present mobile communication device will now be described in detail below and with reference to the drawings.

Figure 1:
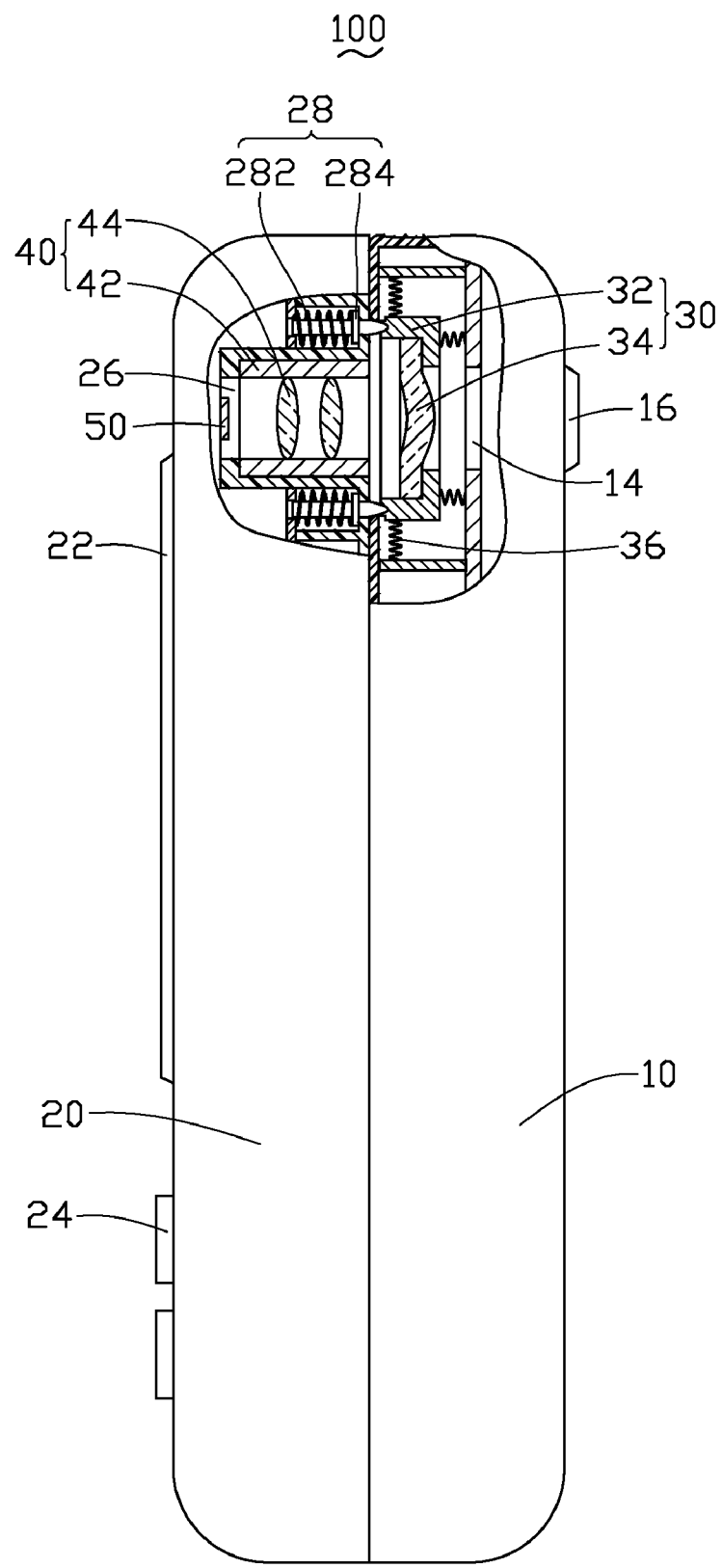
FIG. 1 is an partially cross-sectional view of a mobile communication device at a closed position according to a first preferred embodiment of the present invention.

Referring to FIG. 1, an exemplary mobile communication device 100 according to a first preferred embodiment is shown. The mobile communication device 100 is a mobile phone including a main body 10, a cover body 20 mounted on the main body 10, a first lens module 30 received in the main body 10, a second lens module 40 and an image sensor 50 each configured (i.e., structured and arranged) in the cover body 20.

Figure 2:
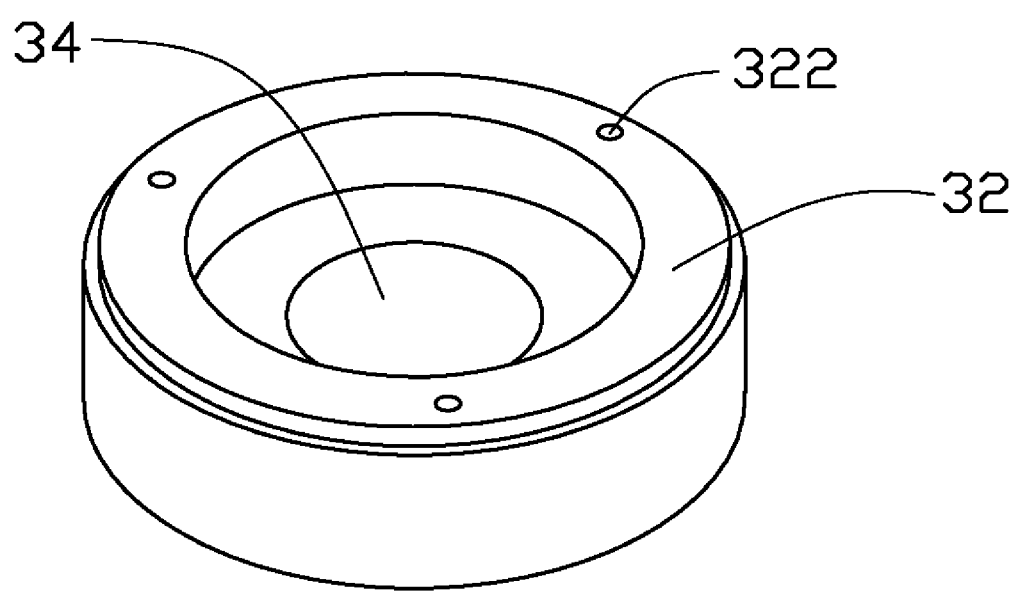
FIG. 2 is a schematic view of the first lens module and the positioning holes shown in FIG. 1.
Figure 3:
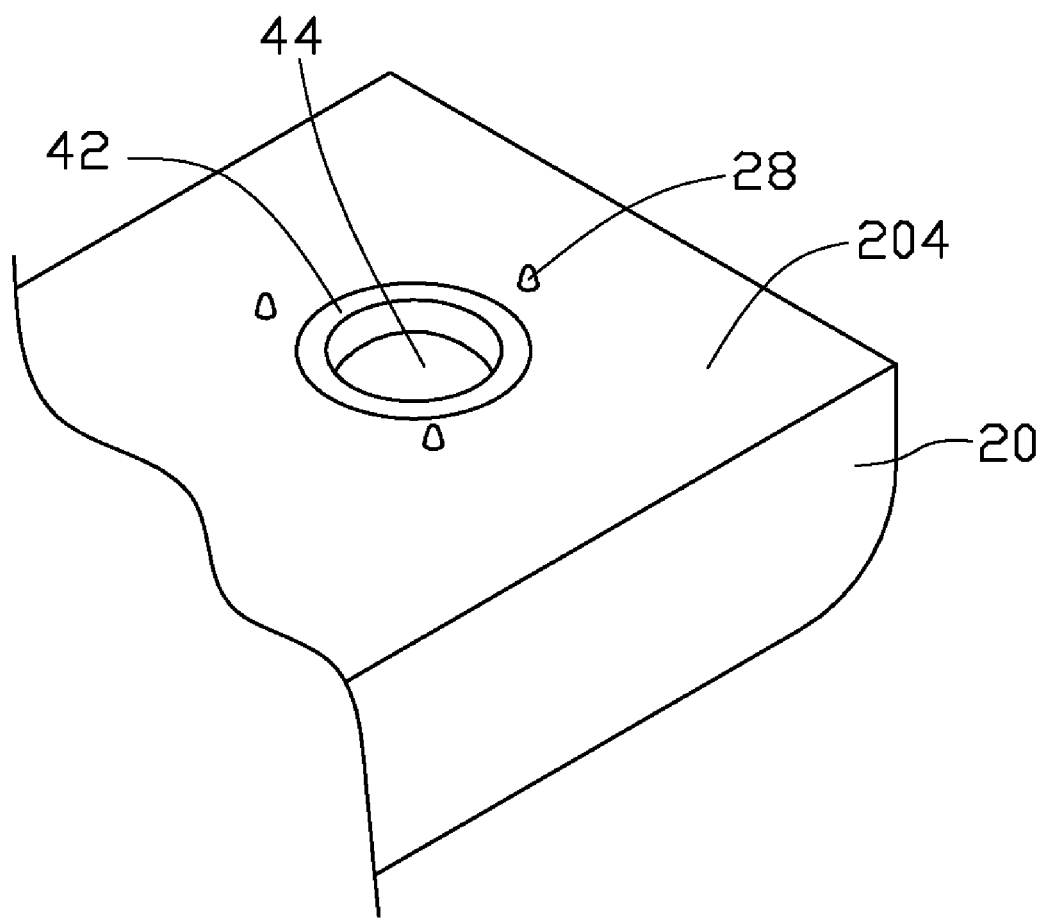
FIG. 3 is a schematic view of the second lens module and the positioning posts in the cover body shown in FIG. 1.
Figure 4:
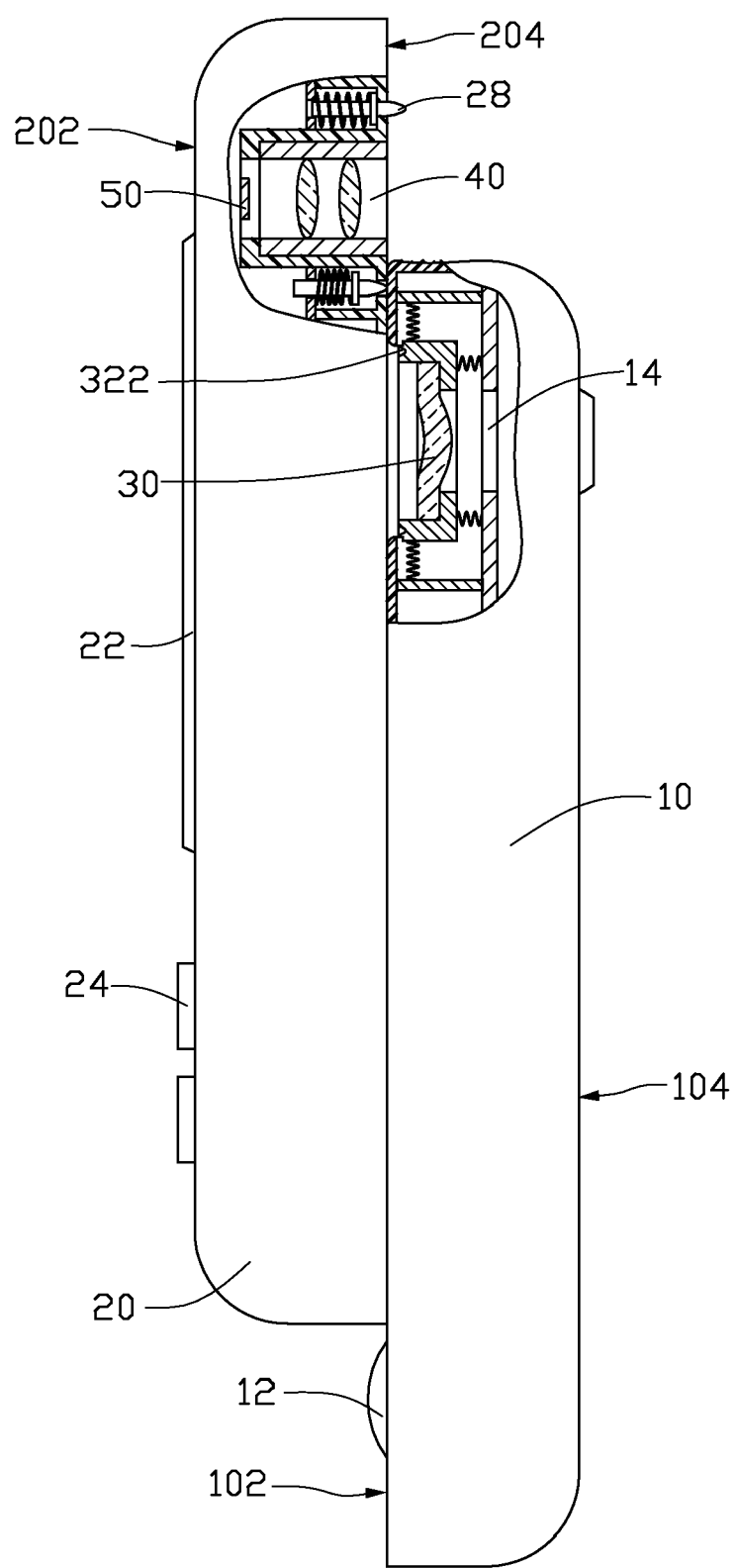
FIG. 4 is a schematic view of the cover body in a partially open position relative to the main body shown in FIG. 1.
Figure 5:
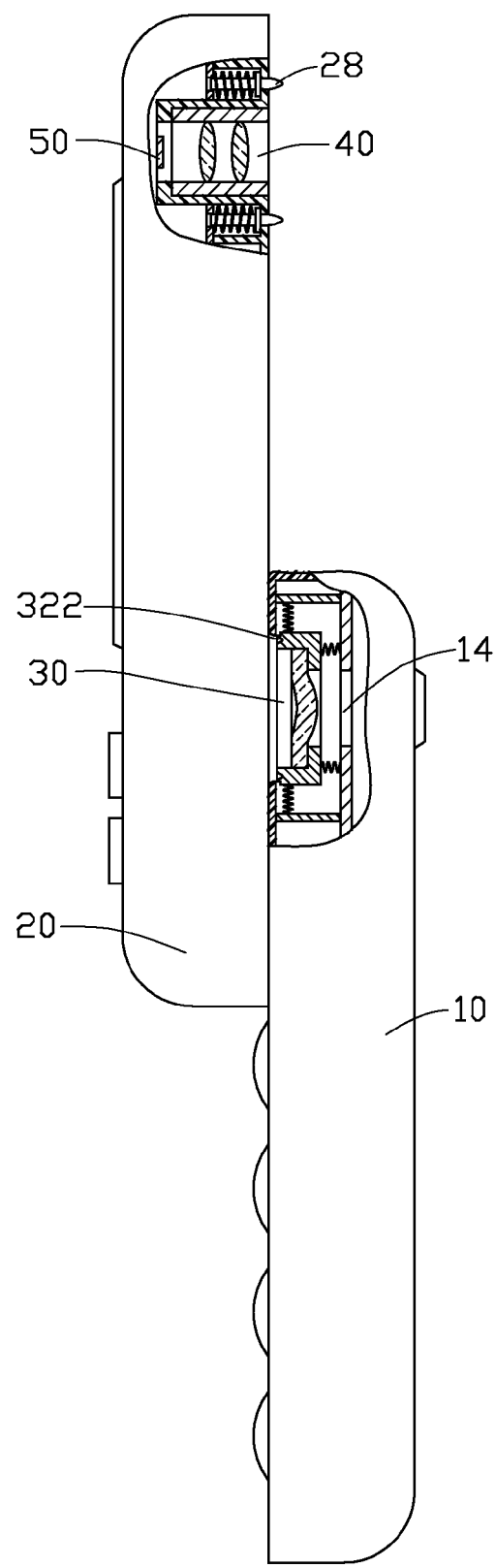
FIG. 5 is a schematic view of the cover body in a fully open position relative to the main body shown in FIG. 1.

Referring to FIGS. 2 to 4, the main body 10 defines a top surface 102, and a bottom surface 104 on an opposite side to the top surface 102. An operating keyboard 12 is defined on the top surface 102. A ladder-shaped through hole 14 is defined between the top surface 102 and the bottom surface 104. The through hole 14 is configured for receiving the first lens module 30 therein. Preferably, a lens cover 16 is defined on the bottom surface 104 for covering the lens module 30 in the through hole 14. The cover body 20 includes an upper surface 202, and a lower surface 204 opposite to the upper surface 202 and facing toward the top surface 102 of the main body 10. A displaying screen 22 and a number of buttons 24 are defined on the upper surface 202. A recess 26 is defined in the lower surface 204 and configured for receiving the second lens module 40 and the image sensor 50. Three resilient positioning members 28 are arranged in the cover body 20 around the recess 26 and are spaced from each other. The three resilient positioning members 28 each are composed of a post 282, and a spring member 284 attached in the recess 26 and capable of applying a force on the respective resilient positioning members 282 in a direction toward the main body 10. The cover body 20 is slidably mounted on the main body 10 between a first position (see FIG. 1) and a second position (see FIGS. 4 and 5). The recess 26 is aligned with the through hole 14 at the first position, and is misaligned with the through hole 14 at the second position.

The first lens module 30 includes a lens barrel 32 and at least one lens 34 received in the lens barrel 32. Three positioning holes 322 are spaced in the end surface (facing toward the cover body 20) of the lens barrel 32. The three positioning holes 322 each have a slanted inner surface. The lens barrel 32 is attached in the through hole 14 by a number of spring members 36.

The second lens module 40 includes a lens barrel 42 and a plurality of the lenses 44 received in the lens barrel 42. The three resilient positioning members 28 are engaged in the respective three positioning holes 322 of the first lens module 30 when the cover body 20 is in the first position (see FIG. 1), and are disengaged from the positioning holes 322 when the cover body 20 is in the second position (see FIGS. 4 and 5). Preferably, the ends of the three resilient positioning members 422, which extend out of the lower surface 204 of the cover body 20, are in a slanted shape, thereby facilitating movement in and out of the respective positioning holes 322. In addition, the corner of the main body 10, which may contact the ends of the three resilient positioning members 28 during movement of the cover body 20, is in rounded in shape, thereby facilitating movement of the three resilient positioning members 28 along the top surface 102 of the main body 10.

The image sensor 50 can be selected from a charge coupled device (CCD for short) or a complementary metal oxide semiconductor transistor (CMOS for short). The image sensor 50 is located at the bottom of the recess 26, and is aligned with the second lens module 40.

The mobile communication device 100 uses the slidable main body 10 and cover body 20 to increase or reduce the first lens module 30 on the second lens module 40, thus giving the mobile communication device 100 a zooming function. Due to engagement of the three resilient positioning members 28 and the three positioning hole 322, the first lens module 30 can be co-axially aligned with the second lens module 40 and image sensor 50 at the first position, such that avoiding misalignment of the first and second lens module 30, 40. The first lens module 30 can adjust position thereof to align with the second lens module 40 under actions of the spring members 284 and the three resilient positioning members 28.

It is understood that the mobile communication device 100 can use only one positioning post 28 and one positioning hole 322 to align the first lens module 30 and the second lens module 40.

Figure 6:
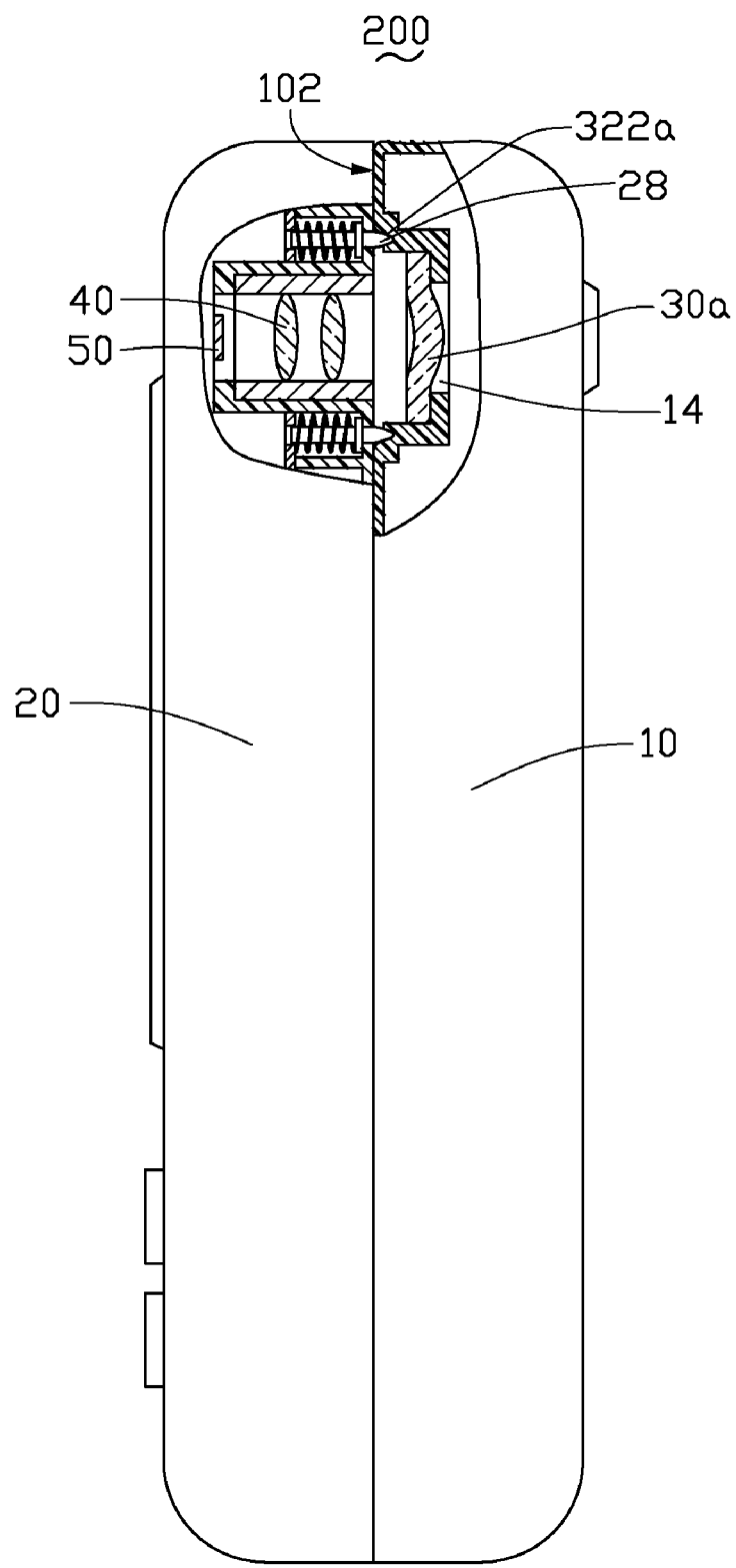
FIG. 6 is an partially cross-sectional view of a mobile communication device according to a second preferred embodiment of the present invention.

FIG. 6 shows an exemplary mobile communication device 200 according to a second preferred embodiment. The mobile communication device 200 is essentially similar to the mobile communication device 100 illustrated in the first preferred embodiment, however, the mobile communication device 100 includes a first lens module 30a which needs no lens barrel and is fixedly engaged in the through hole 14, and three positioning holes 322a defined adjacent to the through hole 14 in the top surface 102 of the main body 10. When the three resilient positioning members 28 of the cover body 20 engage in the respective three positioning holes 322 of the main body 10, the first lens module 30 can also align with the second lens module 40 and the image sensor 50.

It is understood that, the mobile communication device 100, 200 may be a different device other than a mobile phone, but also can be a music player and so on.

It is understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A mobile communication device, comprising:
a main body having a through hole defined therethrough;
a first lens module having at least one positioning hole therein and being received in the through hole of the main body;
a second lens module;
an image sensor; and
a cover body defining a recess therein with the second lens module and the image sensor received in alignment in the recess thereof, the cover body having at least one resilient positioning member for snappingly engaging in the positioning hole, the cover body being slidably mounted on the main body between a first position where the at least one resilient positioning member is engaged in the positioning hole, the second lens module is aligned with the first lens module and the image sensor is capable of detecting light from the first and second lens modules, and a second position where the at least one resilient positioning member is disengaged from the positioning hole, the second lens module is misaligned with the first lens module and the image sensor is capable of detecting light from the second lens module.

2. The mobile communication device as described in claim 1, wherein the main body includes an operating keyboard defined on a surface thereof facing toward the cover body, and the cover body includes a displaying screen defined on a surface thereof apart from the main body.

3. The mobile communication device as described in claim 1, wherein the at least one positioning hole comprises three spaced positioning holes, the at least one resilient positioning member comprises three spaced resilient positioning members, the three resilient positioning members being configured for engagement in the respective positioning holes when the cover body is in the first position.

4. The mobile communication device as described in claim 1, wherein the first lens module comprises a lens barrel and at least one lens received in the lens barrel, and the at least one positioning hole is defined in the lens barrel.

5. The mobile communication device as described in claim 4, wherein the lens barrel is attached in the through hole by a plurality of first spring members.

6. The mobile communication device as described in claim 1, wherein the at least one positioning hole has a slanted inner surface, the at least one resilient positioning member has a slanted end portion so as to facilitate movement in and out of the respective positioning hole.

7. The mobile communication device as described in claim 1, wherein the at least one resilient positioning member comprises a post, and a second spring member for applying a force on the post in a direction toward the main body.

8. The mobile communication device as described in claim 1, wherein the image sensor is selected from the group consisting of charge coupled devices and complementary metal oxide semiconductor transistors.

9. A mobile communication device, comprising:
a main body having a through hole defined therethrough, and at least one positioning hole defined therein adjacent to the through hole;
a first lens module received in the through hole of the main body;
a second lens module;
an image sensor; and
a cover body defining a recess therein with the second lens module and the image sensor received in alignment in the recess thereof, the cover body having at least one resilient positioning member for snappingly engaging in the positioning hole, the cover body being slidably mounted on the main body between a first position where the at least one resilient positioning member is engaged in the positioning hole, the second lens module is aligned with the first lens module and the image sensor is capable of detecting light from the first and second lens modules, and a second position where the at least one resilient positioning member is disengaged from the positioning hole, the second lens module is misaligned with the first lens module and the image sensor is capable of detecting light from the second lens module.

10. The mobile communication device as described in claim 9, wherein the first lens module is fixedly engaged in the main body.

11. The mobile communication device as described in claim 9, wherein the at least one positioning hole has a slanted inner surface, the at least one resilient positioning member has a slanted end portion so as to facilitate movement in and out of the respective positioning hole.

12. The mobile communication device as described in claim 9, wherein the at least one resilient positioning member comprises a post, and a second spring member for applying a force on the post in a direction toward the main body.

* * * * *